April 1, 1941.   E. HUGGINS   2,237,227
RODENT TRAP
Filed June 20, 1940   2 Sheets-Sheet 1
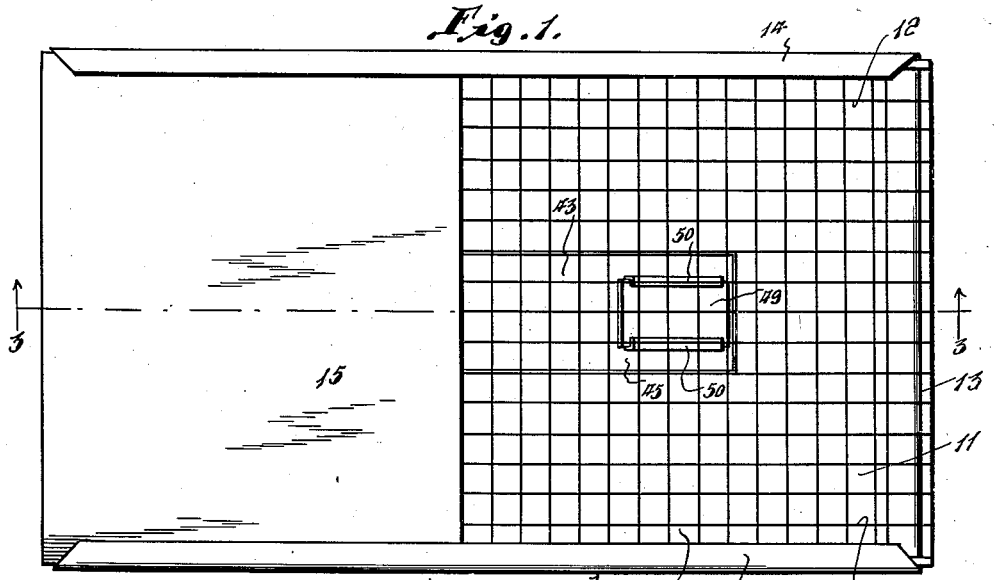
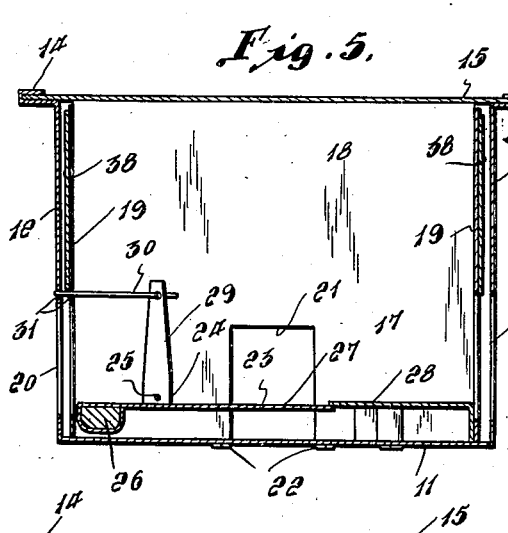
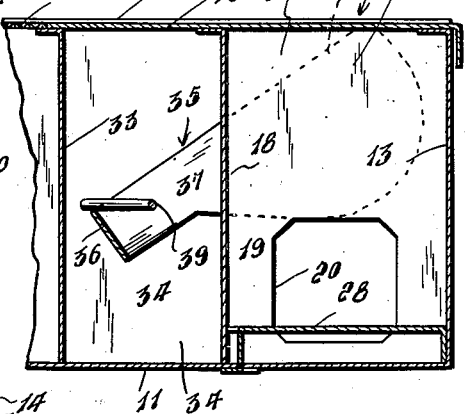
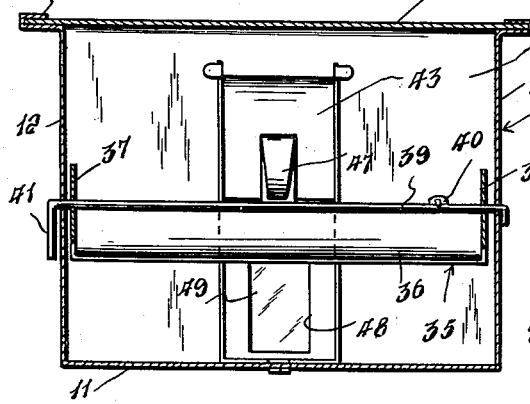
Inventor
Elmer Huggins
By L. F. Randolph
Attorney April 1, 1941.  E. HUGGINS  2,237,227
RODENT TRAP
Filed June 20, 1940  2 Sheets-Sheet 2

Inventor
Elmer Huggins
By
Attorney

Patented Apr. 1, 1941

2,237,227

UNITED STATES PATENT OFFICE 2,237,227

RODENT TRAP

Elmer Huggins, Corinth, Miss.

Application June 20, 1940, Serial No. 341,540

3 Claims. (Cl. 43—76)

This invention relates to an improved construction of rodent trap and more particularly to a rodent trap having a plurality of compartments and means whereby a rodent entrapped in one of said compartments in passing to another compartment, in seeking a means of escape, will reset the trap and become entrapped in the last compartment entered.

Still another aim of the invention is to provide a trap having windows in one of the compartments and in a door, which normally closes an entrance to said compartment, whereby a rodent trapped in another compartment of the trap will proceed into the compartment containing the window, the light from which is visible through the window of said door, in seeking a means of escape.

Still a further aim of the invention is to provide a trap having an entrance compartment provided with entrances at each end thereof forming an unobstructed passage therethrough through either of which a rodent can enter the trap and trip a treadle member mounted therein for simultaneously closing each of said entrances for entrapping the animal therein and for darkening said compartment except for light emitting from another, storage compartment.

Figure 2:
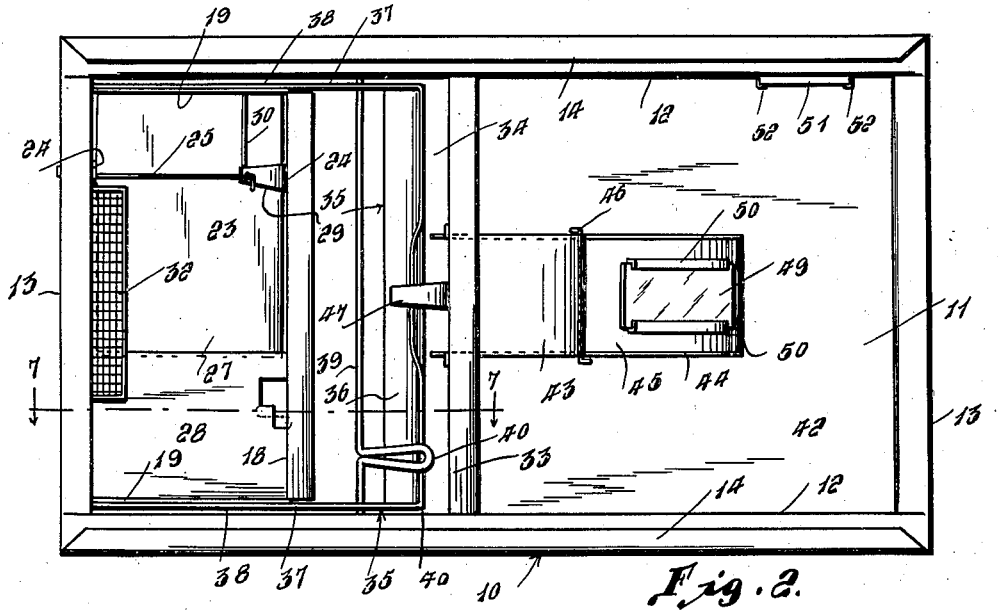
Figure 3:
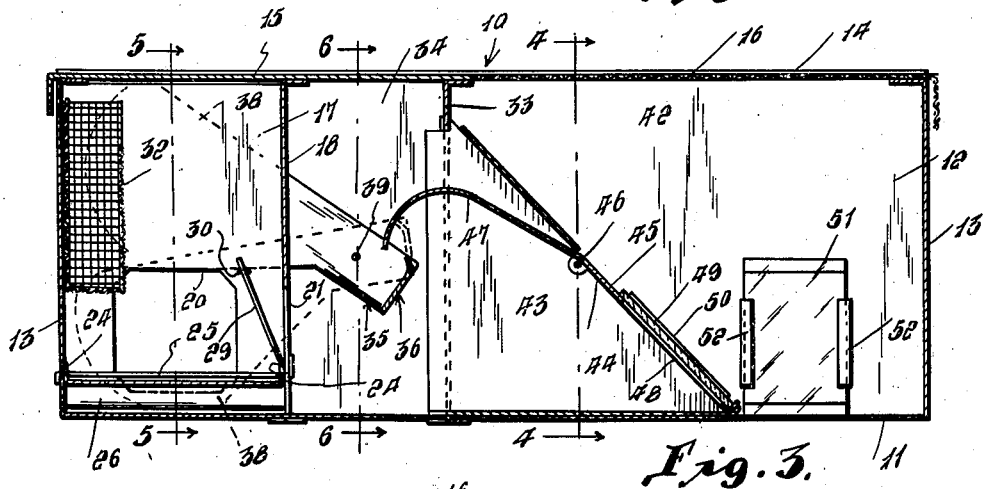
Figure 4:
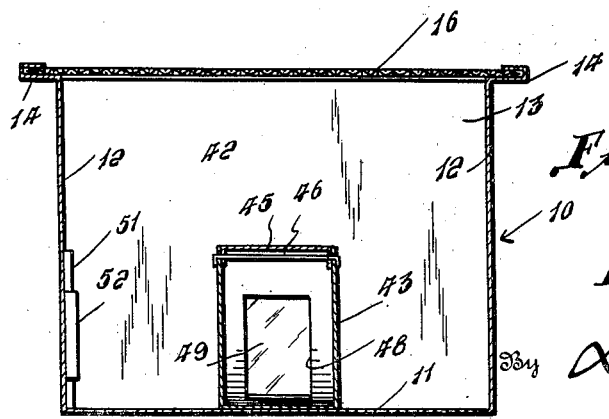

Others objects and advantages of the invention will hereinafter become more fully apparent from the following description of the drawings, which illustrate a preferred embodiment thereof, and wherein:

Figure 1 is a top plan view of the trap,

Figure 2 is a similar view showing the interior of the trap with the top wall thereof removed, Figure 3 is a longitudinal vertical sectional view taken substantially along the plane of the line 3—3 of Figure 1, Figures 4, 5 and 6 are transverse vertical sectional views taken substantially along the planes of the lines 4—4, 5—5 and 6—6, respectively, of Figure 3, and Figure 7 is a longitudinal sectional view taken substantially along the plane of the line 7—7 of Figure 2.

Referring more particularly to the drawings, wherein like reference characters designate like or corresponding parts throughout the different views, 10 desginates generally an elongated casing including a bottom 11, sides 12 and ends 13, which parts are preferably formed of sheet metal. The sides 12 at their upper edges, are provided with outwardly offset inwardly opening channel portions 14 in which are slidably mounted the cover sections 15 and 16, the form of which is preferably formed of sheet metal while the latter is preferably formed of a heavy gauge wire fabric.

A compartment 17 is formed in one end of the casing 10 by means of a transverse partition 18 and the end portions 19 which are formed integral therewith and which are disposed between the sides 12 and adjacent thereto. Each of the end portions 19 is disposed in spaced apart, subtantially parallel relationship to the side 12, adjacent thereto, and each of said portions 19 is provided with an opening which alines with a corresponding opening in the adjacent side wall 12 to form the corresponding alined entrances 20 in each end of the compartment 17. The wall 18 is provided with an opening forming an entrance 21 to another compartment of the trap, as will hereinafter be described. The wall 18 may be secured in the casing 10 in any suitable manner as by means of tongues 22 which extend through the bottom 11 and which are bent outwardly to engage against the underside thereof, as best seen in Figure 5.

A treadle 23 is provided, adjacent one end thereof, with the opposed upset ears 24 through which extends a shaft 25, the ends of which are journaled in the wall 18 and the adjacent end wall 13 for pivotally mounting the treadle in compartment 17 above and adjacent to the bottom portion 11. The shorter end of the treadle 23 extends to adjacent one of the entrances 20, and is provided on its underside with a weight 26 for holding the opposite, elongated end 27 in elevated position. End 27 extends beyond the center of the compartment 17. An elevated platform 28, which is disposed above and in spaced apart relationship to the bottom portion 11 of the compartment 17, extends inwardly thereof from the other entrance 20 with its free end disposed in overlapping relationship to the free end of the treadle portion 27 to retain the treadle in substantially a horizontal position, as seen in Figure 5. One of the ears 24 is elongated to form a lever 29 to the upper end of which is connected a rod 30 having a portion at one end thereof which is slidably mounted in alined openings 31 in one of the portions 19 and in the complementary side 12 to form a detent, for a purpose which will hereinafter become apparent. A bait receptacle 32 of open mesh wire fabric, is secured in any suitable manner to the end wall 13, adjacent the compartment 17, and is disposed in the upper portion of said compartment.

A partition 33 is disposed transversely of the casing 10, substantially intermediate of its ends, to form with the partition or wall 18 a compartment 34. The partition 33 is secured by means of tongues to the casing 10 in the same manner as the wall 18 is secured by its tongues 22. A U-shaped member 35, preferably formed of sheet metal, has its intermediate portion 36 disposed in the compartment 34 and extending substantially from side to side thereof. The corresponding legs 37 of the member 35 are disposed adjacent to the side walls 12 and are provided with enlarged free ends forming closures 38 which extend into the spaces between the sides 12 and the portions 19. A shaft 39 extends transversely through the casing 10 and is journaled in the sides 12. Shaft 39 is disposed longitudinally of the compartment 34 and extends through the legs 37 adjacent the intermediate portion 36 for pivotally mounting the member 35 thereon. The weight of the closure portions 38 causes the member 35 to swing with or relatively to the shaft 39 to permit the closures 38 to swing downwardly for closing the entrances 20 of the compartment 17. The shaft 39, intermediate of its ends, is provided with a looped laterally extending portion forming an arm 40 for engaging the intermediate portion 36, and at one end thereof is provided with a crank arm 41, disposed on the outer side of the casing 10 and by means of which the shaft 39 may be turned to cause the arm 40 to engage and force the intermediate portion 36 downwardly for raising the closures 38 and opening the entrances 20. It will be obvious that when the closures 38 reach a point above the plane of the openings 20 the weight 26 will cause the treadle 23 to move to the position, as seen in Figure 5, causing the detent 30 to move to a position beneath one of the closures 38 to thereby latch the pair of closures 38 in an open position, as seen in Figure 5.

Compartments 17 and 34 occupy substantially one-half of the casing 10, the other half of which forms a chamber 42 of which the partition 33 forms its inner wall. Partition 33 is provided with a passageway 43 which extends inwardly of the chamber 42 and which is provided with an inwardly and downwardly inclined top portion having an opening at its inner end forming an entrance 44 to the chamber 42 from the compartment 34. An inclined door 45 is hingedly connected at its upper end at 46 to the sides of the passageway 43 and extends inwardly and downwardly relatively to the chamber 42 for closing the entrance 44. Door 45 is provided with an arm 47 which extends from its pivoted end into the compartment 34 for engaging the portion 36 to swing the closures 38 upwardly, to their raised positions, when the door 45 is swung upwardly to an open position. Door 45 is provided with an opening 48 over which is disposed a window-pane 49 which is slidably mounted by means of the outwardly offset flanges 50, which are formed integral with the door 45 and which normally retain the pane of glass 49 in position over the opening 48. One of the side walls 12 is provided with an opening, which communicates with the chamber 42 and which is closed by means of a pane of glass 51 which is disposed on the inner side of said wall 12 and which is held in position by means of flanges 52, corresponding to the flanges 50.

From the foregoing it will be obvious that when the top section 15 is in position it will cover the top portions of the compartments 17 and 34 so that these compartments, when the closures 38 are in their released, closed positions, will be substantially darkened. Closures 38 may be manually opened by turning the crank 41 in a counterclockwise direction to cause the extension 40 to swing the portion 36 downwardly to raise the closures 38 which will be latched in a raised position by the detent rod 30, as heretofore described, to set the trap. The trap is adapted to be positioned on a shelf or in any other suitable location where it is apt to obstruct the passage of rodents to thereby cause the rodents to pass through one of the entrances 20 and into the compartment 17 in attempting to pass through said compartment by means of its alined open entrances which will appear to afford an uninterrupted passage. It will be obvious that a rodent on reaching the intermediate portion of the compartment 17, advancing in either direction, will have to step on the end 27 of the treadle 23 to thereby depress said end to move the detent 30 inwardly to release closures 38 which will then swing downwardly to close the entrances 20 and to darken the compartment 17. The rodent, not shown, being thus entrapped and being able to see light in the chamber 42 through the window-pane 49 will pass through entrance 21 into compartment 34 and into the passageway 43 and in order to reach the chamber 42 will push the door 45 to swing it upwardly to an open position so that the rodent may enter the chamber 42. The upward movement of the door 45 will cause the arm 47 to swing downwardly and thereby depress the portion 36 to raise and latch the closures 38 in an open position to thereby reset the trap. As soon as the rodent has passed to the chamber 42 the door 45 will be returned, by gravity, to its closed position to entrap the rodent therein. It will thus be obvious that any number of rodents may be caught in the trap in view of the fact that it is not necessary to manually reset the trap after each catch. The bait receptacle 32, if desired, may be baited for attracting the rodents to the compartment 17. The rodents may be readily removed from the chamber 42 by sliding the cover section 16 outwardly for opening the top of the chamber. Where the cover section 16 is formed of open mesh material, as illustrated, the window-pane 51 may be dispensed with but by thus providing a window in the chamber 42 the cover section 16 may be formed of sheet metal or other solid material similar to the section 15.

Various modifications and changes are contemplated and may obviously be resorted to as only a preferred embodiment of the invention has been disclosed.

I claim as my invention:

1. A rodent trap comprising a casing having a compartment at one end thereof, said casing having openings in its sides forming entrances to said compartment, connected closures pivotally mounted in said casing for normally closing said entrances, a detent for holding said closures in open positions, a treadle mounted in said compartment and connected to said detent for releasing the closures when the treadle is depressed, a platform disposed in the compartment and having an end overlapping an end of the treadle and combining therewith to form the floor of the compartment, said treadle covering a substantially greater area of the compartment than the platform so that a rodent, to enter the compartment, must step on the treadle, a passageway connecting said compartment with a compartment in the opposite end of the casing, said passageway having a gravity actuated normally closed door opening inwardly of said last mentioned compartment and adapted to be opened by a rodent passing therethrough, said door being connected to said closures for returning the closures to an open position to be engaged and held by the detent for resetting the trap, and said last mentioned compartment being provided with a window.

2. In a rodent trap, a casing having a compartment at one end thereof provided with pairs of spaced end walls having alined openings opening outwardly of the sides of said casing, corresponding closure members disposed in the spaces between the walls of said pairs of end walls, said closure members being connected to each other at corresponding ends thereof and being pivotally mounted in said casing, a detent extending through one pair of said end walls for engaging one of said closure members, for holding both of the closure members in a raised, open position, a depressible treadle mounted in said compartment and provided with an upwardly projecting arm connected to said detent for retracting it to release the closure members when the treadle is depressed, said closure members being movable to a closed position by gravity, a compartment intermediate of the ends of said casing, an entrance connecting said compartments, a passageway leading from said last mentioned compartment and disposed in alinement with said entrance, a chamber at the opposite end of said casing into which said passageway extends and opens, a gravity actuated, normally closed door in said passageway adapted to be opened by a rodent passing therethrough, inwardly of said chamber, said door being provided with a window, an extension projecting from said door into said last mentioned compartment for raising said closure members when the door is swung to an open position, and said chamber being provided with a window to admit light to the interior thereof.

3. A rodent trap as in claim 2, said treadle being pivotally mounted adjacent one end thereof and being provided with a weight on one of its ends for normally retaining the other end in an elevated position, said treadle extending from one end to adjacent the opposite end of said first mentioned compartment, and a platform at the opposite end of said first mentioned compartment and disposed at substantially the same level as said treadle and having one end thereof overlapping the last mentioned end of the treadle and combining therewith to form the floor of said compartment.

ELMER HUGGINS.